W. E. COOK.
TRAILER HITCH FOR HARVESTERS AND THE LIKE.
APPLICATION FILED MAY 9, 1921.
1,418,700.
Patented June 6, 1922.
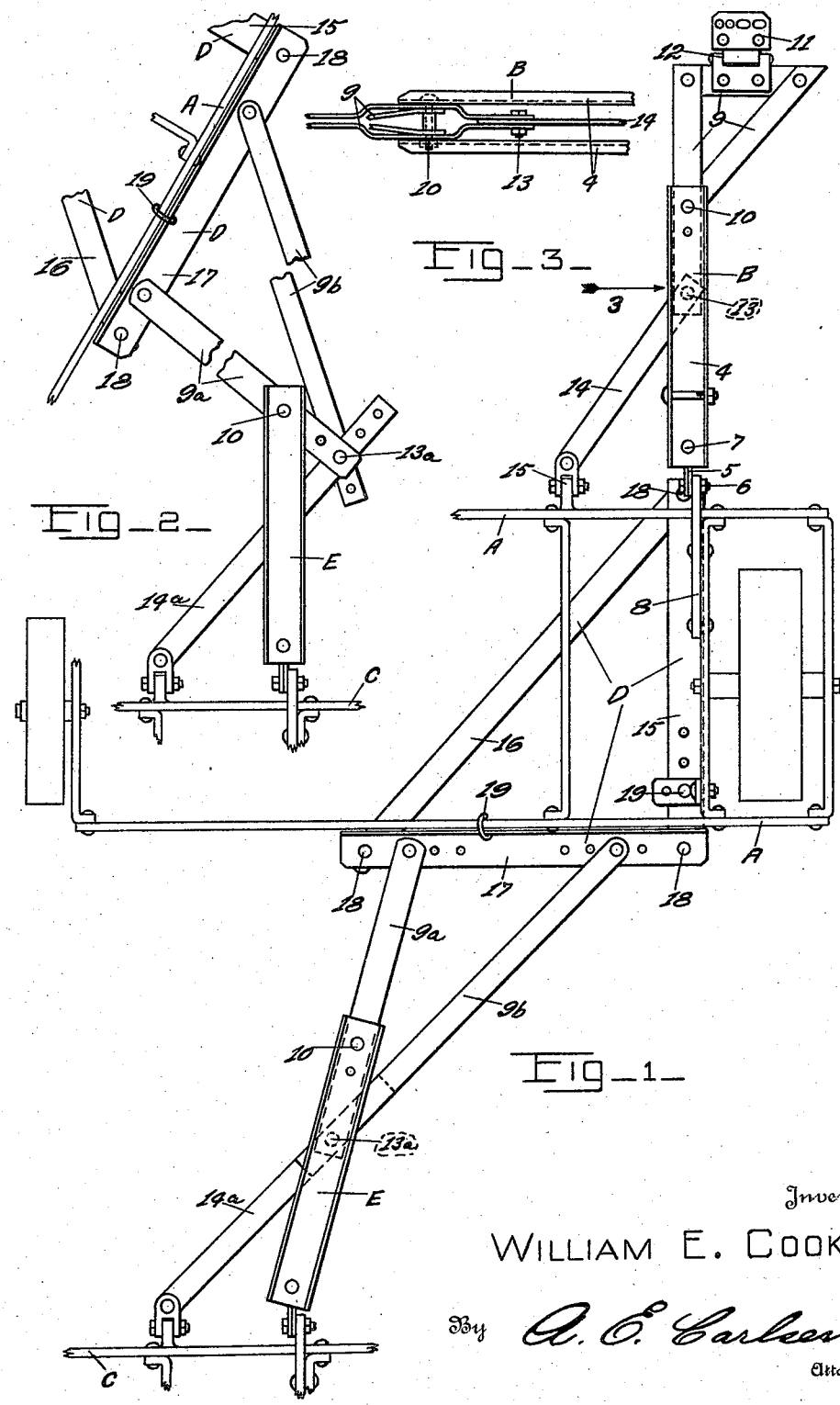
Inventor
WILLIAM E. COOK.
By A. E. Carleen
Attorney

UNITED STATES PATENT OFFICE.

WILLIAM E. COOK, OF MINNEAPOLIS, MINNESOTA.

TRAILER HITCH FOR HARVESTERS AND THE LIKE.

1,418,700.      Specification of Letters Patent.     Patented June 6, 1922.

Application filed May 9, 1921. Serial No. 468,013.

*To all whom it may concern:*

Be it known that I, WILLIAM E. COOK, a citizen of the United States, residing at Minneapolis, in the county of Hennepin and State of Minnesota, have invented certain new and useful Improvements in Trailer Hitches for Harvesters and the like, of which the following is a specification.

This invention relates to hitches or draft appliances for successively drawn vehicles or machinery such as harvesters, and the main object is to provide an efficient and practical device for connecting up such implements and which will eliminate or almost entirely prevent the side strain on the forwardly positioned implements when a series of two or more of them are being drawn over a field. Further objects will be disclosed in the course of the following specification and are illustrated in the accompanying drawing, in which:

Fig. 1 is a plan view of my device shown as connected to two successively drawn binders.

Fig. 2 is a detail view of the rear part of the hitch when in turning position, a portion being broken away.

Fig. 3 is a detail view of a portion of the front part of the device, as seen when looking in the direction of the arrow 3.

Referring to the drawing by reference characters A designates a binder frame which is connected to and pulled by a tractor (not shown) through the medium of what may be called the front hitch B. This hitch B is fully set forth and covered in a patent application filed by me on August 17th, 1920, under Ser. No. 404,265, and is only used in the present instance in conjunction and combination with other elements as hereinafter set forth. The second binder, represented by a frame portion C, is trailed in proper position behind the binder A and is drawn from the hitch B through an auxiliary frame D and what may be termed a rear hitch E. Thus, for purpose of illustration, two binders in offset tandem relation will be used, although it will be understood at the outset that a greater number may be secured together by incorporating in the construction an additional frame D and a hitch E for each additional binder to be trailed.

The front hitch B consists primarily of a double channel iron body member 4, which, when only one binder is to be drawn, is connected at its rear end directly to the binder frame A, but, when a tandem arrangement of binders is used, it is universally connected through a piece 5, a horizontal pivot 6 and a vertical pivot 7, to a piece 8 which is rigidly secured to both the binder A and the frame D. A lever member or frame 9 is pivotally secured as at 10 to the front end of the body 4, and has a connection 11 adapted to be bolted to the draw bar of the tractor so that it will project directly rearward thereof but may have a joint 12 to permit it to swing freely up and down. To the rear end of the lever 9 is pivoted, as at 13, a link bar 14, having its rear end universally connected as at 15 to the binder frame A. When the tractor is then pulling the binder over the field in a straight path, the draft will be directly through the elements 11, 12, 9, 10, 4, 7, 5, 6 and 8 to the binder A, while the link bar 14 serves mainly in properly steering and squaring the binder around a corner when a turn is being made.

The rear hitch E is somewhat similar to the front hitch, just described, but, in order to properly steer and otherwise accommodate the second binder, when making curves or turning around it is found necessary to reconstruct the front part of it so that the lever 9$^a$ is considerably longer than the lever 9, and the bar 9$^b$ is brought down to the point 13$^a$, instead of to 10, as in the front hitch. A link bar 14$^a$ is similar to 14, above mentioned.

The object of the frame D is to relieve the front binder frame of the torsion and strain it would be subject to, because of side draft, in the event the second binder were hitched directly to it, as is now almost universally customary. This problem is forcefully presented in tandem hitches used heretofore, but is overcome almost entirely, if not entirely, by my invention. The frame D is triangular, consisting of three members 15, 16 and 17, which are rigidly secured together by bolts or rivets 18, and it is held suspended under the binder frame by any suitable means such as hangers 8 and 19. It will thus be seen that the pull on the rear hitch will come from the front hitch directly and almost entirely through the angular member 16, and not through the rest of the frame D or through the front binder frame A, the result being that each binder in the series connected will be drawn independently of every other binder and directly and flexibly from the draw bar of the tractor, there still being retained the proper cooperating mechanisms for correctly maintaining the successive offset tandem relations of the harvesters.

Having thus fully shown and described my invention, what I claim to be new and desire to protect by United States Letters Patent is:

In a device of the class described and in combination with a harvester frame, an independently formed draft frame suspended under said harvester frame, said draft frame being in the form of a right angle triangle with one leg thereof lying in a longitudinal direction with the direction of movement of the harvester frame and the other leg forming a transverse draft beam at the rear of the harvester frame for connection with a hitch adapted to draw a second harvester frame in offset tandem relation to the first harvester frame.

In testimony whereof I affix my signature.

WILLIAM E. COOK.